United States Patent

[11] 3,557,341

[72] Inventors Ilya Andreevich Tikhonov;
Ivan Alexandrovich Dzhanshiev,
Leningrad; Anatoly Egorovich Sochilin;
Eduard Nikolaevich Yakunin, Velikie Luki,
U.S.S.R.
[21] Appl. No. 751,577
[22] Filed Aug. 9, 1968
[45] Patented Jan. 19, 1971
[73] Assignee Severo-Zapadnoe Otdelenie Vsesojuznogo
Gosudarstvennogo Proektno-
Izyskatelskogo Nauchno-Issledovatelskogo
Instituta "Energosetpoekt"
Leningrad, U.S.S.R.

[54] APPARATUS FOR PROTECTING A.C. SWITCHES AND ELECTRICAL EQUIPMENT AGAINST LOW TEMPERATURES AND ICING
1 Claim, 4 Drawing Figs.

[52] U.S. Cl. .................................................. 219/511
200/166C, 200/162; 335/99
[51] Int. Cl. .................................................. H05b 1/00,
H01h 3/00
[50] Field of Search ....................................... 219/209,
511; 174/40, 126, 128; 343/704; 117/235, 240;
335/99, 100, 146, 154, 196, 208, 204; 200/166C,
162

[56] References Cited
UNITED STATES PATENTS

| 1,721,785 | 7/1929 | Meyer | 174/128X |
|---|---|---|---|
| 3,218,384 | 11/1965 | Shaw | 174/40 |
| 3,249,466 | 5/1966 | Lusher | 117/235 |
| 3,296,364 | 1/1967 | Mason | 174/126X |
| 3,316,344 | 4/1967 | Kidd et al. | 174/126X |
| 3,316,345 | 4/1967 | Toms et al. | 174/126 |
| 3,414,430 | 12/1968 | Maho | 117/240X |
| 3,057,978 | 10/1962 | Huetten | 335/146X |
| 3,290,630 | 12/1966 | Dyksterhouse et al. | 335/146 |

FOREIGN PATENTS

| 1,088,765 | 10/1967 | Great Britain | 335/208 |
|---|---|---|---|
| 469,805 | 3/1952 | Italy | 174/126 |

Primary Examiner—A. Bartis
Assistant Examiner—Peter W. Gowdey
Attorney—Waters, Roditi, Schwartz & Nissen ABSTRACT: An AC switch comprises blade contacts in which at least one contact member has at least one ferromagnetic portion integrally incorporated therein so that load current passes through the ferromagnetic portion when the switch is closed. The ferromagnetic portion is interposed in series with the remaining portion of the accommodating contact so as to become a component of the operating current electric circuit.

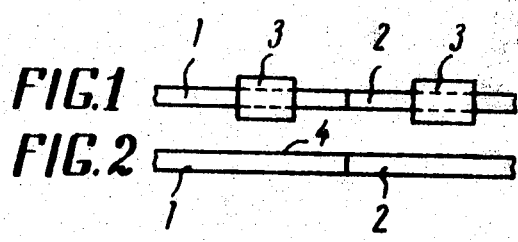
FIG.1
FIG.2
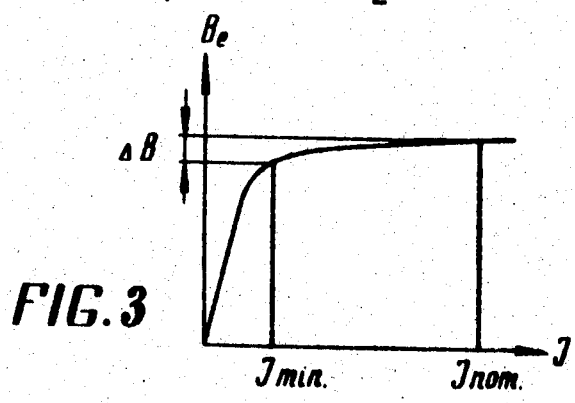
FIG.3
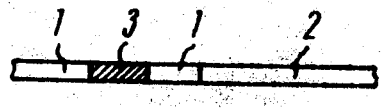
FIG.4

APPARATUS FOR PROTECTING A.C. SWITCHES AND ELECTRICAL EQUIPMENT AGAINST LOW TEMPERATURES AND ICING

The present invention relates to devices for protecting AC switchgear and electrical equipment against low temperatures and icing.

The device is adapted for use in outdoor electrical installations such as substations and generating stations, in switchgears, as well as in separately mounted equipment or apparatus which is under voltage and featured by load current flowing therethrough (for example, at disconnector knife blades of disconnecting and isolating switches, at circuit breaker contacts, inputs into apparatus and premises, etc.) and which is installed in regions with low temperatures and is likely to become subject to icing.

The experience of servicing the outdoor electrical installations under cold climatic conditions shows that low temperatures, icing and ice-crusted formation frequently interferes with normal functioning of the electrical installations any may even be the cause of a breakdown.

Besides, under low temperature conditions (from 30° C. below zero to 60° C. below zero) due to contraction of the cooled metal, the knife blades of disconnecting switches or isolating switches "freeze" to the contact jaws and are not capable of moving therefrom upon receiving a pulse for a disconnecting operation with the result that the apparatus is not disconnected. The analogous phenomenon is observed when icing takes place.

Moreover, the layer of ice thus formed on the current carrying members makes the construction heavier, and increase wind load onto the current-carrying members. Due to the fact that low temperatures, frost and icing are observed over a large part of the globe, said phenomena are the cause of considerable damage to electrical installations. Therefore, taking into consideration the intensified development of territories in extreme northern and southern areas of both hemispheres it becomes a very urgent matter to preclude electrical installations from the effect of the above-mentioned phenomena.

If failures in operation of operating mechanisms of disconnecting switches, isolating switches and etc., caused by low temperatures can be prevented by the choice of a grease or lubricant with a low freezing point or by means of local heating, there exists no simple and reliable means to prevent failures in operation of contact systems functioning under high voltages, say in high-voltage installations.

Conventional devices adapted to preclude freezing and icing of switches suffer from a number of disadvantages and are inconvenient in service as will be explained hereinafter.

Thus, the electric heating by means of electric furnaces and tubular-heating elements with ohmic resistance is not practicable due to the difficulty in power supply and the danger of a breakdown. Heating by warm air delivered from an external heating source is constructionally complicated and is expensive, therefore, it has found no application in practice.

Moreover, ice breaking by virtue of a blow torch suspended from an insulated rod as well as chopping the ice mechanically offers great difficulties.

The devices adapted to prevent icing of split contacts of electrical apparatus by means of mechanical destruction of the crust of ice require increased mechanical efforts and are effective only in cases where the thickness of ice is not in excess of a particular value. Moreover, the above-mentioned devices fail to prevent "freezing" of contacts under low temperature conditions. Apart from this, said devices cannot be employed in contact systems of high-speed disconnecting apparatus such as circuit breakers, isolating switches, etc. since the disconnection moment of said apparatus from the relay protection is not known beforehand which may lead to a breakdown.

More reliable and reasonable are devices capable of preventing icing and freezing of the component units of the electrical equipment and apparatus.

A device featuring a short-circuited aluminum turn isolated from the wire, adapted to prevent icing of conductors of the transmission lines is constructionally inconvenient for the equipment employed at substations.

It is a primary object of the present invention to eliminate the above-mentiond disadvantages.

The invention is aimed at the development of a device for protecting electrical equipment against low temperatures and icing which shall be simple in design and reliable in operation and shall prevent freezing of current carrying members of the apparatus involved and icing thereof by virtue of electrical heating of the apparatus in question.

According to the invention, said object is accomplished by the fact that in the device for protecting AC switchgear and electrical equipment against low temperatures and icing by resorting to heating of the equipment or apparatus involved by electrical-heating elements, said heating elements are essentially ferromagnetic bodies which are so fixed on the equipment or apparatus involved that they are subject to heating by the magnetic field created by the load current flowing through the protected equipment.

The ferromagnetic bodies, which are essentially electrical-heating elements, may be of such a shape and be mounted so as to embrace a part of the protected equipment or apparatus completely or partially. Moreover, the ferromagnetic bodies may be formed by a coating of the material applied upon the protected equipment or apparatus and featuring ferromagnetic properties.

It is expedient that the magnetic bodies be made detachable, be inserted into the circuit of the operating current of the protected equipment or apparatus, and be made use of as members of the current-carrying circuit.

The advantages of the herein-proposed method are: simple implementation of the invention in contemplation both for manufacturing new apparatus and for increasing the operational reliability of already manufactured and mounted apparatus; high efficiency; and great reliability with no possibility of an electric breakdown in the high-voltage installations.

The invention will be more apparent from the following description of exemplary embodiments thereof, reference being made to the accompanying drawings, wherein:

FIG. 1 represents an elementary diagram of the device, according to the invention, wherein a plate is used as a ferromagnetic body;

FIG. 2 represents an elementary diagram of the device, according to the invention, wherein a coating of a material featuring ferromagnetic properties is used as a ferromagnetic body;

FIG. 3 shows the dependence of induction of the ferromagnetic body on current flowing through the protected equipment or apparatus; and FIG. 4 is an elementary diagram of the device, according to the invention, wherein a ferromagnetic body is series-connected into the circuit of the operating current flowing through the protected equipment or apparatus.

Heating of ferromagnetic bodies made of steel, cobalt and of a number of alloys is due to energy release of hysteresis and eddy current losses caused by the variable magnetic field created by the load current flowing through the protected equipment or apparatus. The heat thus evolved in said ferromagnetic bodies either raises the temperature of the components of the apparatus involved and prevents ice-crust formation, excessive cooling and "freezing" of contacts or melts the ice formed.

The ferromagnetic bodies may vary in shape depending upon the configuration of the equipment or apparatus to be protected.

The energy released by the ferromagnetic body can be calculated from the following expression:

$$P = SHe\sqrt{\frac{WMe}{\gamma}}, \text{ where;}$$

$P$ is loss of energy;
$S$ is the ferromagnetic body surface;
$He$ is the intensity of the magnetic field created in the material on the surface of the body involved;
$W$ is the angular frequency of the alternating current creating the magnetic field;
$Me$ is the magnetic permeability; and
$\delta$ is specific conductivity.

Taking into consideration the local conditions as well as the value of the current involved, the rate of cooling, the ambient temperature, and the maximum permissible temperature, the characteristics of the ferromagnetic body are determined to maintain the above-zero temperature of the protected apparatus such as a contact knife blade of an isolating or disconnecting switch, capable of preventing said apparatus from freezing or icing.

The ferromagnetic bodies fixed in position on the protected equipment or apparatus may feature movable parts which can be replaced with respect to the main portion of the ferromagnetic body which fact provides for the possibility to control the quantity of the heat evolved in the ferromagnetic body depending upon the required conditions.

The evolution of heat in the ferromagnetic body occurs with the current flowing therethrough, i.e. the evolution of heat is always ensured in the most critical circuits which cannot be disconnected. In particular, with low temperature operating conditions, power transformers are generally never cut off for fear of oil freezing, stoppage of circulation and subsequent local overheating when the transformer is switched into the circuit again.

The disconnecting switches which are not alive, such as those inserted in the circuits to the gap cells, as a rule, are not critical components and are seldom involved in operation. Therefore, to break the ice formed on the above-said disconnecting switches or to warm them up they may be cut off if required.

Let us consider a number of embodiments of the devices adapted to protect AC switchgear and electrical equipment against low temperatures and ice deposition.

Referring to FIG. 1 it can be seen that the device is employed in a horizontal disconnecting switch featuring a left-hand blade 1 and a right-hand blade 2. For the sake of simplicity the lamellas providing for the contact, as well as the insulators and the fastening parts are not shown in the drawing.

The blade 1 carries (without insulation) a ferromagnetic body 3 which is essentially a plate embracing the blade 1. A similar plate may embrace the blade 2 (as it is shown in FIG 1) if one plate fails to provide for safe protection.

The heat from the ferromagnetic bodies when the load current flows through the disconnecting switch in question is transferred to the blades 1 and 2 of the disconnecting switch and prevents ice-crust formation on said blades and excessive cooling thereof.

In addition to the disconnecting switch, isolating switches, the contacts of circuit breakers, as well as inputs into apparatus or dwellings and other electrical equipment subject to low temperatures and ice-crust formation can be protected, and plates, rings, sleeves, clamps, endpieces or tips may serve as the ferromagnetic bodies.

Now referring to FIG. 2 the blades 1 and 2 are applied with a coating of a material featuring ferromagnetic properties. Said coating serves as a ferromagnetic body. Ferromagnetic enamels, paints and varnishes may be used as the above-said ferromagnetic coating.

In cases when the range of the value of the current flowing through the protected apparatus is considerable, the ferromagnetic bodies in the herein-proposed device are so selected that they are magnetically saturated within the required portion of the range of the operating current fluctuations.

All the above-said will be more apparent when referring to FIG. 3 wherein plotted on the X-axis is the current I flowing through the apparatus protected by a ferromagnetic body whereas plotted on the Y-axis is the induction of the ferromagnetic member $Be$.

The characteristics of the ferromagnetic body are so selected that the conditions of the magnetic saturation occur at a minimum possible value of the operating current $I_{min}$. Thus, in case of operating current fluctuations within the full range up to the rated value $I_{nom}$, the induction $Be$ will not substantially change, therefore, the power of the electromagnetic losses is kept almost constant with the result that the efficiency of heating will not practically depend upon the current involved. The ferromagnetic bodies are made of ferromagnetic materials or magnetic alloys featuring increased hysteresis and eddy current losses and capable of saturating with preset current fluctuations.

The presence of ferromagnetic bodies in the magnetic field of the protected apparatus through which the current flows causes electrodynamic forces both between the ferromagnetic bodies and between the conductor and each of the ferromagnetic bodies involved.

Taking in consideration the above-mentioned fact, an embodiment of the device provides for such an arrangement of the ferromagnetic bodies with respect to each other and to the conductor that the arising electrodynamic forces contribute to an increase of the electrodynamic stability of the entire system.

For example, the electrodynamic forces may be directed to increase the contact pressure of the detachable contacts in the apparatus with the short circuit current involved.

In a number of cases the opportunity arises to simplify or to dispense with the construction elements of the apparatus which were specially adapted to provide for electrodynamic stability of the apparatus thereby making it more simplified and inexpensive.

The introduction of the ferromagnetic bodies into the current conducting systems results in some increase in weight of the equipment and in consumption of material. Moreover, the introduction of ferromagnetic bodies in the moving parts of the high-speed apparatus may result in some decrease of speed response.

To eliminate the above-said, the device provides in some cases for the possibility to extend the functions of the ferromagnetic bodies by inserting the latter into the operating current electric circuit of the device under protection or by employing said bodies as elements of the current-conducting circuit such as current conductors, contacts, contact plates, lamellas, clamps, means for creating contact pressure etc., as it is shown in FIG. 4 where a ferromagnetic body 3 is constituted as a portion of the left-hand blade 1 and is in series connection with the adjoining portions of blade 1.

Such a combination of functions makes it possible to decrease the number of components of the device and the weight of the construction.

The herein-disclosed device and the modifications thereof, in particular, may be employed at the contact systems of isolating switches, i.e. disconnecting switches capable of automatically cutting off no-load current flowing through the equipment or apparatus involved since this is one of the most urgent problems to provide for a serviceability thereof under the cold environmental conditions. The most distinguished feature of the herein-proposed device is that it can be employed in regions where most intensive ice formation is likely to occur as the above-said device is generally adapted to prevent any ice formation.

In regions having warm summers and cold winters, the ferromagnetic bodies may be made detachable and be mounted on the apparatus in the cold season only.

We claim:

1. AC switch apparatus comprising contact members having open and closed states, at least one member at including at least one ferromagnetic portion integrally incorporated therein at an intermediate location providing portions on opposite sides thereof so that load current passes through said ferromagnetic portion when the members are in a closed state, said one contact member having a substantially uniform cross section throughout its length both through the ferromagnetic portion and said portions on opposite sides thereof.